United States Patent [19]

Parks

[11] 3,742,185

[45] June 26, 1973

[54] LITHIUM CONTAINING WELDING ELECTRODE

[75] Inventor: John M. Parks, Solon, Ohio

[73] Assignee: The Lincoln Electric Company, Cleveland, Ohio

[22] Filed: May 7, 1971

[21] Appl. No.: 141,375

[52] U.S. Cl................... 219/146, 117/202, 219/137
[51] Int. Cl............................................. B23k 35/22
[58] Field of Search.................... 219/145, 146, 137, 219/74; 117/202–207; 148/24, 26

[56] References Cited
UNITED STATES PATENTS

| | | | |
|---|---|---|---|
| 3,573,426 | 4/1971 | Blake et al. | 219/146 |
| 3,466,417 | 9/1969 | Chapman et al. | 219/146 |
| 2,141,995 | 12/1938 | Leitnch | 219/146 |
| 3,177,340 | 4/1965 | Danhier | 219/146 |
| 3,627,574 | 12/1971 | Belong et al. | 117/206 |
| 3,513,289 | 5/1970 | Blake et al. | 219/146 |

Primary Examiner—J. V. Truhe
Assistant Examiner—George A. Montanye
Attorney—Meyer, Tilberry & Body

[57] ABSTRACT

An electrode for electric arc welding in air and a method of using same. The electrode contains lithium compounds and agents to reduce these compounds to elemental lithium in the welding arc. Lithium is added to the welding rods preferably in the form of lithium fluoride and/or lithium silicates, while the reducing agents are preferably calcium, aluminum and magnesium, and are preferably added in the form of intermetallic compounds of calcium and aluminum, and calcium and magnesium. A quench material to de-stabilize or quench the lithium-containing arc plasma and give it a higher voltage gradient may also be used. Satisfactory quench ingredients include carbohydrates; sugar (sucrose), because of its ready availability and lost cost, is preferred.

13 Claims, No Drawings

LITHIUM CONTAINING WELDING ELECTRODE

This invention pertains to the art of electric arc welding and more particularly to an improved electrode and method for electric arc welding in air.

The invention is particularly applicable to electric arc welding in air using a bare tubular electrode wherein flux material is on the inside of the tube, and will be described with particular reference thereto, although it will be appreciated that the invention has, in some instances, broader applications.

In the art of electric arc welding, a rod or tube shaped electrode of weld metal is energized by an electric power source and an electric arc is struck between the electrode and the workpiece. The heat of the arc melts the electrode and a spot on the workpiece into which the molten metal of the electrode is deposited. It is, generally speaking, desired to deposit a weld metal which is free of porosity and which has a high impact strength as well as satisfactory yield, tensile and elongation characteristics. The composition of the weld metal deposited by the electrode must be carefully controlled to assure that the weld has these characteristics.

Porosity of the weld metal can be caused by various factors.

One cause of porosity is the reduction of iron oxide to iron by carbon present in the workpiece metal, thereby causing carbon monoxide and/or dioxide gas to form in the molten weld and to be entrapped as the metal solidifies. A principal source of iron oxide is the reaction of atmospheric oxygen with the molten surface of the weld bead and with the droplets of the molten electrode as they move through the arc.

Accordingly, it has been known to provide in the electrode composition components known as deoxidizers, which, because of their affinity for oxygen, reduce the amount of available oxygen in the molten metal so that as the metal cools there is not enough oxygen available to combine with the carbon to form carbon monoxide and/or dioxide. The deoxidizers are thus oxidized in preference to carbon in the molten weld metal, thus precluding the formation of carbon oxides. Many materials, for example, aluminum, titanium, and silicon to name but a few, are useful as deoxidizers but tend to alloy with the weld metal and if present in excessive amounts to give it undesirable physical characteristics such as brittleness, i.e., low impact strength. Magnesium and calcium are also good deoxidizers, but have such low boiling temperatures as to be less effective. Calcium is also highly unstable in moist air.

Another, and a major cause of porosity is the entry into the weld pool of atmospheric nitrogen. As the dissolved nitrogen seeks to come out of solution as the molten metal cools, the metal solidifies around the escaping bubbles of gas, causing porosity of the metal. This phenomenon may be referred to as "nitrogen boil." It is known that the nitrogen boil may be suppressed by the use of excess - over that required for deoxidation — aluminum (or titanium, zirconium, etc.) present in the electrode composition. However, these deoxidizers react with nitrogen to form stable nitrides which are entrapped as inclusions in the weld metal. Excessive amounts of these nitrides cause the resultant weld metal to have poor impact properties.

In addition, unreacted excess aluminum also enters the weld metal and, in excessive amounts (generally, anything in excess of about 1 percent aluminum) also has an adverse effect on the metallurgical properties of the weld metal.

Consideration of those problems led to the conclusion that what was needed was a way to exclude nitrogen from the arc plasma and weld zone, thus preventing it from entering the weld metal, rather than only to attempt to remove it after it had already entered. Accordingly, U.S. Pat. No. 2,909,648, dated Oct. 20, 1969, in the name of Landis et al and assigned to the assignee of this application, describes the use of a metallic coating on the surface of a steel electrode which coating vaporizes in the heat of the arc to provide a metallic vapor shield around the arc, thereby excluding the atmosphere (and its nitrogen) from the vicinity of the weld pool. The use of a shielding metal in the electrode represented an advance over the prior art which, as described in the Landis et al patent, had theretofore required the use of a protective gas atmosphere or a windrow of granulated flux deposited on the weld seam to protect the molten weld metal from the atmosphere.

At the time the application which resulted in the Landis et al patent was filed, it was believed that the upper limit on the boiling temperature of the shielding metal coating should be at about the boiling temperature of the steel electrode, i.e., at about 2,800° C. Subsequent research, however, indicated that the shielding metal boiling point did not have to exceed the melting point of the steel electrode (1,535° C.) and that lithium, whose boiling point is well below 1,535° C., was one of the best shielding metals.

Further research on the protective effect of lithium has now indicated that nitrogen entry into the weld metal occurs through the mechanism of nitrogen oxides and not elemental nitrogen dissolving into the molten metal, and that the nitrogen oxides are formed by reaction of atmospheric oxygen and nitrogen in the heat of the welding arc. For example, welding tests in a pure nitrogen atmosphere showed significantly less nitrogen retention than identical tests carried out in air (nitrogen and oxygen). When elemental lithium metal is introduced into the arc, the lithium boils to a gas and by thermal diffusion excludes the heavier nitrogen gas by occupying the central core of the arc, causing the heavier nitrogen to diffuse to the cooler fringes of the arc. By thus excluding nitrogen from the hot central core of the arc, the formation of nitrogen oxides is substantially reduced and porosity is eliminated.

While not wishing to be bound by the correctness of the foregoing theory, it is nonetheless known that elemental lithium in the welding arc effects a substantial suppression of the nitrogen boil.

Accordingly, copending patent application Ser. No. 2,643, filed Jan. 13, 1970, now U.S. Pat. No. 3,691,340, in the name of G. G. Landis et al. and assigned to the assignee of this application, discloses the use of lithium metal as an arc shielding material to protect the welding arc by excluding the atmosphere therefrom. The lithium was believed to form a vapor shield around the droplets of the weld metal as they move from the arc into the weld pool.

The use of lithium metal, i.e., elemental lithium, in a welding electrode presents a basic and severe problem, however. The lithium metal is so highly reactive that it reacts with the oxygen and moisture in the air when the electrode is in storage. Its highly reactive nature causes deterioration and change in welding characteristics if the electrode is stored for any length of time.

In addition, other problems, which application Ser. No. 2,643 purports to solve, are involved in the use of metallic lithium. According to Ser. No. 2,643, the lithium is preferably applied to the electrode as an outer coating alloyed with modifier metals to prevent premature boiling-off of the shielding lithium. In order for the metal to metallurgically bond to the electrode, it had to be alloyed with other metals which formed metallurgical bonds to steel, or, alternatively, an intermediate layer of bonding metal was required. The bonding and modifier metals also had to have alloying characteristics with steel which were not detrimental to the impact strength and ductility of the weld.

Further, the coating of the electrode with shielding and alloying metals presented manufacturing problems such as requiring that the surfaces of the electrode to be coated be thoroughly cleaned, that the surfaces be protected from the atmosphere during the coating operation and that grooves or score-marks be provided along the surface of the electrode to accept the coating.

The above-described problems encountered in using elemental lithium led to attempts to employ a lithium compound as a shielding component. Thus, U.S. Pat. No. 3,488,469, dated Jan. 6, 1970, in the name of R.C. Buss and assigned to the assignee of this application describes a tubular electrode containing, in addition to aluminum deoxidizer and alloying agents, lithium carbonate as a protective or shielding component for the welding arc. If enough lithium carbonate was used to provide sufficient protection for the arc, the nitrogen boil was suppressed without the need for introducing a nitrid forming material, such as aluminum, in amounts which would unduly affect the impact strength of the weld metal, and a non-porous, good impact strength weld metal was obtained.

Although Buss indicated that it was not known precisely how the lithium carbonate functioned, he implied that its excellent melting action and the closeness of its decomposition temperature (1,310° C) to the melting temperature of steel provided shielding of the weld metal from the atmosphere and its nitrogen.

Research carried out subsequent to the filing of the application which matured into the Buss patent indicated that the reason that the Buss composition functioned as it did was probably not for the reasons Buss stated, but that the Buss composition contained sufficient aluminum to reduce the lithium carbonate to elemental lithium in the heat of the arc, and that the satisfactory results obtained could be attributed solely to the presence of the elemental lithium in the arc. It is believed that lithium oxide formed by the thermal decomposition of lithium carbonate is reduced to elemental lithium by the aluminum.

While the lithium carbonate employed by Buss is believed to ultimately be reduced to elemental lithium in the arc, the decomposition of the lithium carbonate releases carbon dioxide gas in an explosive manner which causes a spatter of molten weld metal. The spatter is unsightly and has to be cleaned up after the welding operation is completed. Also, the release of carbon dioxide gas tends to disrupt the arc.

In addition to these problems, lithium carbonate is inefficient in that relatively large quantities of lithium carbonate are required in the formulation to sufficiently suppress the nitrogen boil, i.e., to obtain a sufficiently large quantity of elemental lithium in the arc plasma.

The problems involved in using elemental lithium in the electrode, and the success of lithium carbonate, led to further research which indicated that the lithium could be introduced into the welding arc in the form of any lithium compound which could be reduced to elemental lithium in the heat of the welding arc, thereby providing the desired degree of protection. A practical difficulty encountered with this approach, however, is that most lithium compounds are hygroscopic and/or so stable that they are not reduced to lithium in sufficient quantities in the heat of the welding arc. The following compounds are among those investigated: lithium fluoride, the lithium silicates, (ortho- and metasilicates and bimetallic silicates, such as lithium calcium silicate), lithium oxalate, lithium aluminate, lithium oxide, lithium chloride, lithium ferrite and lithium titanate.

Lithium oxide, lithium chloride and lithium ferrite are all reducible to elemental lithium in the welding arc, but were all found to be too hygroscopic in that electrodes containing them picked up excessive quantities of moisture from the air while in storage. While usable, they are not preferred since they pick up moisture so rapidly that they must be used immediately or kept in air-tight packages prior to use, or used only in a moisture-free atmosphere, all of which expedients have obvious practical and economic disadvantages. Lithium oxalate explosively decomposes into a gas in the heat of the arc and was even more troublesome in this regard than lithium carbonate. Lithium aluminate, while not hygroscopic, was so stable that it could not be reduced to elemental lithium by conventional reducing agents in sufficient quantities to suppress the nitrogen boil in the arc. Lithium titanate, while it could be reduced to elemental lithium in the arc in sufficient quantities, was found to introduce excessive amounts of titanium into the weld metal which adversely affected its metallurgical properties.

Accordingly, the preferred lithium compounds remaining in the foregoing compilation are lithium fluoride and lithium silicates, including bimetallic lithium silicates.

Lithium fluoride is not so readily reduced to lithium, nor are the lithium silicates. Lithium fluoride, however, can be reduced somewhat by magnesium or readily by calcium, whereas silicon is ineffective to reduce it. For example, although inclusion of lithium fluoride (and other compounds) as a melting agent to protect molten metal weld pools is shown in the above-mentioned Landis et al. patent, e.g., at column 5, lines 5 thru 20, the lithium fluoride can not be reduced to elemental lithium in Landis et al. because no calcium is provided as the reducing agent. In example 11 of the Landis et al patent, lithium fluoride is shown in combination with silicon, iron and manganese, none of which is capable of reducing lithium fluoride to lithium in the welding arc. Lithium silicates can be reduced by calcium, magnesium and aluminum and, to a lesser extent, by silicon.

The presence of lithium in the arc plasma also tends to increase the length of the welding arc for a given voltage or, stated otherwise, tends to reduce the voltage gradient across a given arc. Since it is generally desirable to attain a high voltage gradient across the arc so that more work can be done in the weld zone, and because the shorter arc can be more easily protected from the atmosphere, it is desirable to de-stabilize or quench the lithium-containing arc.

The present invention contemplates a new and improved welding electrode which employs lithium compounds other than lithium carbonate, as the major source of lithium, and a reducing agent to reduce the lithium compounds to elemental lithium in the arc.

In accordance with the present invention, a welding electrode is provided wherein the flux contains lithium compounds other than lithium carbonate and highly reactive reducing agents which react in the heat of the arc with the lithium compounds to provide elemental lithium therein. The reducing agents are also highly effective deoxidizers. By use of the lithium compounds to exclude nitrogen, the amount of aluminum (or other deoxidizer - reducing agent metals such as magnesium or silicon) required can be reduced, which in turn reduces the aluminum or aluminum nitride (or other metal and metal-nitride) inclusions in the weld metal. It is these inclusions which adversely affect the impact strength and other metallurgical properties of the weld metal.

In accordance with a limited aspect of the invention, lithium fluoride and lithium silicate compounds, which do not yield large quantities of spatter-causing gas upon decomposition, are employed as the lithium compounds of the welding electrode in combination with reducing agents sufficiently powerful to reduce these compounds to elemental lithium in the heat of the arc.

As stated above, although lithium fluoride can be somewhat reduced by magnesium, it can be readily reduced by calcium. However, calcium is a highly reactive element, unstable in air and therefore extremely difficult to store and handle in the manufacturing process. Accordingly, another limited aspect of the invention provides for calcium alloys and intermetallic compounds which are stable in air and which serve to readily reduce lithium fluoride to elemental lithium in the welding arc.

Lithium silicates can also be reduced in the heat of the arc by aluminum, magnesium, and silicon. Accordingly, in another limited aspect of the invention, lithium silicates and aluminum, magnesium and/or silicon reducing agents are provided in a welding electrode.

In accordance with another limited aspect of the invention, a minor, non-spatter causing proportion of lithium carbonate is used in conjunction with the lithium compounds and reducing agents of the invention.

In accordance with yet another limited aspect of the invention, quenching of the arc plasma is accomplished by introducing carbohydrates into the arc plasma as agents to displace a portion of the lithium therefrom.

It is known, as aforesaid, that when lithium is included in the electrode composition, the related problems of nitrogen entry into the weld and poor impact and other metallurgical properties of the weld metal due to the presence of excessive deoxidizers are overcome because the entry of nitrogen into the weld metal is markedly reduced.

In accordance with the invention, elemental lithium can be introduced into the arc by means of lithium compounds and reducing agents, including non-hygroscopic calcium reducing agents, which compounds and agents are sufficiently stable in storage and handling to permit their use in the manufacture of electrodes for commurcial use.

Such lithium compounds may be used alone or in conjunction with not more than about 0.6 percent weight percent (of total electrode weight) of lithium carbonate. When lithium carbonate is limited to such amounts, it does not cause appreciable spatter during welding.

In accordance with the invention, a convenient means of introducing calcium into the electrode wherein it serves as a reducing agent for the lithium compounds, (and is the only reducing agent powerful enough to reduce lithium fluoride in sufficient quantities) is to introduce it in the form of an intermetallic compound of calcium and aluminum. It has been found that a satisfactory calcium aluminum intermetallic compound may be prepared by melting suitable proportions of calcium and aluminum in an argon or other inert atmosphere to form $CaAl_4$ and $CaAl_2$. This mixture of two intermetallic compounds contains approximately 42 percent by weight calcium. Intermetallic calcium-aluminum compounds are quite stable in air and may be safely stored and handled during the manufacturing process.

The calcium in the electrode reacts with, for example, lithium fluoride in accordance with the following formula:

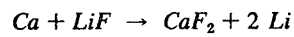

$$Ca + LiF \rightarrow CaF_2 + 2\ Li$$

It is thus seen that one mol weight of calcium is required for each 2 mols of lithium fluoride reduced. Accordingly, on a weight basis, the proportions of calcium to lithium fluoride in the finished electrode should be not less than 4.0 parts calcium to 3.4 parts lithium fluoride in order to satisfy the stoichiometry of the above equation. In practice, an excess amount of calcium is provided since a portion of the calcium is oxidized by the oxygen of the atmosphere during the course of the welding and by contact with oxygen at the surface of the weld bead. Further, when other compounds of lithium are included in the electrode, as will be more fully described hereafter, the stoichiometric weight ratio of calcium (or other reducing agent) to the other lithium compounds must, of course, be taken into consideration. It has been found in practice, as will be more fully described hereinbelow, that the amount of calcium which must be present in the electrode in order to provide enough lithium to limit to acceptably low levels the amount of nitrogen in the weld metal, varies between about 0.5 percent and about 1.5 percent of the total electrode weight.

It was found, however, that in order to provide sufficient calcium in the electrode, the amount of aluminum introduced in the form of the intermetallic calcium-aluminum compound was excessive and resulted in a weld bead which displayed poor impact strength, i.e., a weld bead which was too brittle. In order to overcome this problem, a second intermetallic compound — magnesium calcium ($Mg_2Ca$) — was prepared and introduced into the electrode in combination with the calcium aluminum intermetallic compound. In this manner, by controlling the proportion of calcium aluminum and magnesium calcium intermetallic compounds, the total amount of aluminum introduced into the weld metal can be controlled. Aluminum, generally less than 1.0 percent by weight of the weld metal, is generally useful in refining the grain of the weld metal and contributing towards increased yield strength. In excessive amounts, however, aluminum tends to render the weld metal brittle, as has been hereinabove stated. Therefore, it is one aspect of the present invention to provide a reducing agent for lithium compounds in the form of a mixture of intermetallic calcium-aluminum and calcium magnesium compounds. It will be appreciated that the required amount of calcium and aluminum may be introduced into the electrode in other forms such as, for example, in the form of an alloy or combination of alloys of these metals. A combination of intermetallic compounds as described is, however, preferred, since these compounds are highly brittle and stable in air so that they may be pulverized into a powder and conveniently handled in the manufacturing process. (Whether or not a combination of calcium and aluminum or magnesium is considered an alloy, an intermetallic compound or a mixture of metals is not essential to either the understanding or practice of the invention. The terms "alloy" and "intermetallic compound" as used herein are intended to include all usable forms of calcium and metal combinations.)

While it is possible to introduce enough lithium into the electrode composition to preclude substantially any nitrogen entry into the weld metal, it is generally satisfactory to use only enough lithium to reduce the amount of nitrogen retained in the weld metal to generally not more than about 0.03 weight percent of the weld metal. An electrode content of about 0.2 percent by weight of lithium is sufficient under the conditions prevailing in the welding arc to maintain nitrogen at a level not greater than about 0.03 percent in the weld metal. Generally, it is preferred in accordance with one aspect of this invention, to prepare an electrode containing sufficient lithium compounds to provide from about 0.2 to about 0.5 percent by weight lithium in the electrode composition.

It has been found that from about 0.5 to about 1.5 percent by weight of metallic calcium is required to reduce the preferred amount of lithium and to provide sufficient excess calcium to serve as a deoxidizing slag when the lithium is supplied as lithium fluoride.

A secondary benefit has been observed to be derived from the presence of calcium in the electrode. The calcium fluoride formed by the reduction of lithium fluoride is a principal component of the slag which forms during the welding operation. Both lithium fluoride and calcium are readily soluble in the molten calcium fluoride. The calcium thus in solution in the slag is in intimate contact with the weld metal and deoxidizes the weld metal by reducing to iron any iron oxide formed. As hereinabove stated, iron oxide, because it is reduced to iron by carbon particles in the steel with the concomitant generation of carbon dioxide gas, is believed to contribute to porosity of the weld bead. In this manner, the calcium present tends to reduce the amount of aluminum or other alloy-forming deoxidizers which would otherwise be required.

Because of the deoxidizing effect of calcium present in the slag mixture, aluminum may be introduced into the electrode in amounts which yield less than about 1 percent aluminum, and preferably less than about 0.7 percent aluminum in the weld deposit. An aluminum content of 0.7 percent in the weld deposit is more than adequate to assure adequate deoxidation and good impact and other mechanical properties of the weld metal. Calcium and magnesium do not appear in the weld deposit because they are vapors at the melting temperature of steel.

In accordance with the present invention, the amount of reduced lithium, i.e., elemental lithium, available in the arc must be sustained at a level that will permit the exclusion of nitrogen from the plasma by means of being displaced therefrom by the lighter lithium gas. In order to sustain this level by the reduction of lithium fluoride to lithium, a greater reducing potential is required to be maintained than that which would be required if lithium silicates were also used as a source of lithium. This is so because lithium silicates can be reduced by reducing agents having a lower reducing potential than calcium, such as aluminum, magnesium, silicon, titanium, and zirconium. A calcium reducing agent is required to reduce lithium fluoride to elemental lithium. Therefore, in accordance with a limited aspect of the present invention, lithium compounds may be introduced into the welding electrode in the form of mixtures of lithium fluoride and lithium silicates. Lithium orthosilicate ($Li_4SiO_4$) is a convenient compound to serve as a vehicle for introducing lithium into the electrode. Lithium orthosilicate, however, tends to dust and create an irritating condition for those working in the electrode manufacturing process. Accordingly, lithium metasilicate ($Li_2SiO_3$) which does not tend to dust as does lithium orthosilicate, is preferably used in combination with lithium orthosilicate. Lithium metasilicate is not preferably used by itself because the ratio of lithium to silicon in lithium metasilicate is too low. Another convenient compound for introducing lithium into the electrode, which also serves to introduce calcium, is lithium calcium orthosilicate ($Li_4CaSiO_4$).

Lithium carbonate, if used in quantities not greater than about 0.6 percent of the electrode weight, can be used without the occurrence of excessive spatter, but this quantity of lithium carbonate is not sufficient to provide adequate elemental lithium in the arc plasma. For example, 0.5 percent (of electrode weight) lithium carbonate in the electrode composition will provide only about 0.095 percent elemental lithium in the weld metal deposit and a minimum of about 0.2 percent (of electrode weight) elemental lithium is desired. However, it has been found that the carbon monoxide produced from the small amounts (not greater than 0.6 percent electrode weight) of lithium carbonate is beneficial in improving the arc voltage gradient and penetration of the arc weld metal.

Generally, a mixture of one or more of the foregoing compounds in combination with lithium fluoride is a preferable means of introducing lithium into the electrode. A preferred mixture of lithium compounds comprises three mol weights of lithium orthosilicate and two mol weights of lithium calcium silicate in admixture with lithium fluoride. Another preferred mixture includes lithium carbonate in an amount not greater than about 0.6 percent of the electrode weight. Of course, lithium fluoride or any of the lithium silicates may be used alone. When lithium fluoride is employed as the source of elemental lithium, calcium, in elemental, alloy or intermetallic form, must be employed as a reducing agent. Reference in the claims to "selected" reducing agents which are "capable of reducing" the lithium compounds means that, in addition to other criteria used in selecting a reducing agent, if lithium fluoride is used as a lithium source a corresponding amount of calcium must be used as a reducing agent.

It is therefore a principal object of this invention to provide a welding electrode which gives a non-porous weld bead of high impact strength, and good yield, tensile and elongation characteristics by reducing nitrogen entry and excessive alloying of the weld metal.

It is another principal object of the invention to provide a method of electric arc welding in air wherein lithium, to exclude nitrogen from the welding arc, is provided by reducible lithium compounds.

It is another object of the invention to provide stable calcium containing reducing agents to reduce such compounds to lithium.

It is another object of the invention to provide a method of electric arc welding in air wherein the welding arc containing lithium is de-stabilized or quenched by agents which tend to displace a portion at least of the elemental lithium from the arc.

It is still a further object of the invention to provide a welding electrode containing a non-spatter causing minor proportion of lithium carbonate, other lithium compounds which do not cause spatter when used in the welding process, one or more agents to reduce such lithium compounds to elemental lithium in the arc, and one or more agents to quench or de-stabilize the arc.

Other objects and advantages of the invention will become apparent in the following detailed description of preferred embodiments thereof.

Preferred embodiments and specific effects of the invention are described in detail in this specification with reference to an embodiment of the invention comprising a hollow tube steel electrode containing a mixture including lithium compounds and reducing agents in accordance with the invention.

A hollow electrode shell of low carbon steel is formed around a material containing lithium compounds, preferably a mixture of lithium fluoride and lithium silicates. A hollow electrode is well suited to introduce, in accordance with one aspect of the invention, lithium compounds, reducing agents and quenching agents into the welding arc. The material also contains one or more reducing agents, preferably including intermetallic compounds of calcium and magnesium, and calcium and aluminum. These intermetallic compounds are pulverized and introduced into the material in a suitable mixing operation. The material preferably also contains iron powder to increase its bulk so that the material completely fills the hollow electrode and also contains other conventional fluxing and all alloying materials to meet specific needs of adjusting slag volume, composition, melting point, etc.

In manufacture of the electrode, the material may be deposited in the form of a powder, on a U-shaped strip adapted to receive the powder and this strip is formed into a hollow electrode by abutting the ends of the U-shaped strip into a seam. The hollow electrode may then be drawn through a sizing die which reduces the outside diameter thereof to the desired size and simultaneously serves to further compact the material contained therein.

The presence of elemental lithium in the arc plasma reduces the plasma voltage gradient which tends to increase the length of the arc and reduce the amount of work that can be done in the weld zone. To this end, and in accordance with a limited aspect of the present invention, an agent had to be found which would tend to de-stabilize or quench the lithium-containing arc plasma to give it a higher voltage gradient. The quenching medium had to be one which would displace to a controlled degree a portion only of the elemental lithium from the arc core. The addition of sugar (sucrose) to the electrode composition was found to have the desired effect. The sucrose disassociated in the heat of the arc, releasing (H), (CH) and (OH) radicals which tend to quench the plasma sufficiently to increase the voltage gradient as well as to augment lithium as nitrogen-excluding agents.

From this, it was reasoned that many of the carbohydrates (generally, compounds with the formula $(CH_2O)n$, with "$n$" equal to or greater than four) would work and tests were made which tend to verify this. The availability of sucrose and the convenience of its physical state for manufacturing purposes increases its attractiveness over other carbohydrates as a source of (H), (CH) and (OH) radicals.

Specific examples of preferred composition of electrodes prepared in accordance with the present invention are given in the following examples, along with their respective weld metal analysis and physical properties.

EXAMPLE I

A. Electrode Composition

| Fill | Wt. % |
|---|---|
| $Al_2O_3$ | 5.00 |
| MgO | 0.40 |
| LiF | 2.20 |
| $BaF_2$ | 2.50 |
| 40%Ca-31%mg-29%Al | 3.00 |
| Fe-Mn-C | 0.60 |
| $BaSiF_6$ | 0.20 |
| $TiO_2$ | 0.03 |
| $Li_4SiO_4$ | 1.00 |
| Ni | 0.40 |
| Fe | 4.67 |
|  | 20.00 |
| Steel Shell | 80.00 |
| Total | 100.00 |

B. Weld Metal Analysis and Properties

| Percent C | 0.124 |
|---|---|
| Percent N | 0.023 |
| Percent Al | 0.67 |
| Percent Mn | 0.81 |
| Percent Si | 0.14 |
| Yield Strength | 64,200 psi |
| Ultimate Tensile Strength | 77,900 psi |
| Percent Elongation | 21 % |
| Charpy V-Notch at 0° F. | 27 ft.-lbs. |

EXAMPLE II

A. Electrode Composition

| Fill | Wt. % |
|---|---|
| $CaF_2$ | 2.10 |
| $Al_2O_3$ | 1.60 |
| MgO | 2.40 |
| 67%LiF-33%$CaF_2$ | 1.90 |
| $BaF_2$ | 1.50 |
| 60%Al-40%Ca | 1.70 |
| 55%Mg-45%Ca | 2.20 |
| Ni | 0.40 |
| Fe-Mn-C | 0.60 |
| Cellulose | 0.10 |
| Fe | 1.50 |
|  | 16.00 |
| Steel Shell | 84.00 |
| TOTAL | 100.00 |

B. Weld Metal Analysis and Properties

|  | 5 pass | 15 pass |
|---|---|---|
| Percent C | 0.158 | 0.159 |
| Percent N | 0.024 | 0.027 |
| Percent Mn | 0.74 | 0.76 |
| Percent Al | 0.78 | 0.89 |
| Percent Ni | 0.35 | 0.38 |
| Yield Strength | 53,500 psi | 66,400 psi |
| Ultimate Tensile Strength | 74,900 psi | 82,700 psi |
| Percent Elongation - | 25 % | 22 % |

EXAMPLE III

A. Electrode Composition

| Fill | Wt. % |
|---|---|
| $CaF_2$ | 9.00 |
| MgO | 1.50 |
| $K_2SiF_6$ | 0.30 |
| Mg | 1.40 |
| Al | 1.40 |
| Fe-Mn-C | 0.60 |
| $TiO_2$ | 0.04 |

|               |           |        |
|---------------|-----------|--------|
| $Li_2CO_3$    |           | 0.60   |
| $Li_2SiO_3$   |           | 0.75   |
| Fe            |           | 4.41   |
|               |           | 20.00  |
| Steel Shell   |           | 80.00  |
| TOTAL         |           | 100.00 |

B. Weld Metal Analysis and Properties

| | | |
|---|---|---|
| Yield Strength | | 64,900 psi |
| Ultimate Tensile Strength | | 81,400 psi |
| Percent Elongation | | 20 % |
| Charpy V-Notch at 0° F. | | 39 ft-lbs. |
| Charpy V-Notch, at 0° F. | 52 ft-lbs. | 41 ft-lbs. |

Using electrodes prepared in accordance with the present invention, a substantial decrease has been noted in nitrogen entry into the weld bead and thus a major cause of the porosity of the weld bead has been eliminated.

While any suitable combination of lithium containing compounds and reducing agents may be employed in the practice of the invention, lithium fluoride, as aforesaid, makes essential the use of a calcium reducing agent, which alone is "capable" of reducing lithium fluoride to elemental lithium in the welding arc. Suitable reducing agents are additionally selected on the basis of their efficiency in reducing the lithium compounds used and their contribution to the over-all electrode and weld metal properties.

While the invention has been largely described with reference to preferred embodiments, modifications and alterations within the scope of the invention will occur to those skilled in the art upon a reading and understanding of this specification and it is my intention to include all such modifications and alterations as part of my invention.

Throughout this specification and in the following claims, unless apparent from the contents or specifically stated otherwise, whenever a weight percentage (wt. percent) is indicated, such percentage is intended to be a percentage by weight of the total weight of the welding electrode, i.e., the weight of the electrode steel shell or rod plus the weight of the other electrode ingredients.

What is claimed is:

1. An arc welding electrode comprising a steel tube and conventional flux ingredients, said flux ingredients essentially including between about 0.2 wt. percent to about 0.5 wt. percent lithium by weight of the electrode in the form of one or more lithium compounds selected from the class consisting of lithium fluoride, the lithium silicates, lithium oxalate, lithium aluminate, lithium oxide, lithium chloride, lithium ferrite and lithium titanate, and one or more reducing agents present in at least the stoichiometric amount necessary to reduce said lithium compounds to elemental lithium and selected from the class consisting of calcium, intermetallic calcium compounds, calcium alloys, aluminum, magnesium, silicon, titanium and zirconium, and essentially including at least one of calcium, intermetallic calcium compounds, calcium alloys and magnesium when lithium fluoride is included.

2. The arc welding electrode of claim 1 wherein calcium-containing reducing agents are present therein in an amount required to provide at least one mol-weight of calcium for each two mol-weights of lithium.

3. The arc welding electrode of claim 1 wherein said lithium compounds comprise at least one of lithium orthosilicate, lithium metasilicate, and lithium calcium silicate.

4. The arc welding electrode of claim 1 containing additionally not more than about 0.6 percent by weight of the electrode lithium carbonate as part of the total lithium content.

5. The arc welding electrode of claim 1 wherein said lithium compound is lithium fluoride and said reducing agent is selected from calcium, intermetallic calcium compounds and calcium alloys.

6. The arc welding electrode of claim 5 wherein said reducing agents include at least one of calcium-aluminum intermetallic compounds, calcium-aluminum alloys, calcium-magnesium intermetallic compounds and calcium-magnesium alloys.

7. The arc welding electrode of claim 8 wherein said reducing agents are present in amounts required to provide at least one mol-weight of calcium for each two mol-weights of lithium.

8. The arc welding electrode of claim 5 containing lithium in the form of lithium fluoride and between about 0.5 and about 1.5 percent by weight calcium by weight of the electrode contained in reducing agents selected from calcium-aluminum intermetallic compounds, calcium-aluminum alloys, calcium-magnesium intermetallic compounds, calcium-magnesium alloys, and mixtures thereof.

9. The arc welding electrode of claim 1 including one or more quenching agents selected from the class consisting of sucrose and other carbohydrates of the general formula $(C \cdot H_2O)_n$, where $n \geq 4$.

10. An arc welding electrode comprising a steel tube and conventional flux ingredients, said flux ingredients essentially including between about 0.2 wt. percent to about 0.5 wt. percent lithium by weight of the electrode in the form of one or more lithium compounds selected from the class consisting of lithium silicates, bimetallic lithium silicates, and lithium fluoride, and one or more reducing agents present in at least the stoichiometric amount necessary to reduce said lithium compounds to elemental lithium and selected from the class consisting of calcium, intermetallic calcium compounds, calcium alloys, aluminum, magnesium, silicon, titanium and zirconium and essentially including at least one of calcium, intermetallic calcium compounds, calcium alloys and magnesium when lithium fluoride is included.

11. An arc welding electrode, comprising a steel shell and flux ingredients, the electrode having the following approximate composition:

| Fill | Wt. % |
|---|---|
| $Al_2O_3$ | 5.00 |
| MgO | 0.40 |
| $LiF_2$ | 2.20 |
| $BaF_2$ | 2.50 |
| 40%Ca-31%Mg-29%Al | 3.00 |
| Fe-Mn-C | 0.60 |
| $BaSiF_6$ | 0.20 |
| $TiO_2$ | 0.03 |
| $Li_4SiO_4$ | 1.00 |
| Ni | 0.40 |
| Fe | 4.67 |
|   | 20.00 |
| Steel Shell | 80.00 |
| Total | 100.00 |

12. An arc welding electrode, comprising a steel shell and flux ingredients, the electrode having the following approximate composition:

| Fill | Wt. % |
|---|---|
| $CaF_2$ | 2.10 |
| $Al_2O_3$ | 1.60 |
| MgO | 2.40 |
| 67%LiF-33%$CaF_2$ | 1.90 |
| $BaF_2$ | 1.50 |
| 60%Al-40%Ca | 1.70 |
| 55%Mg-45%Ca | 2.20 |
| Ni | 0.40 |

13. An arc welding electrode, comprising a steel shell and flux ingredients, the electrode having the following approximate composition:

| Fill | Wt. % |
|---|---|
| $CaF_2$ | 9.00 |
| MgO | 1.50 |
| $K_2SiF_6$ | 0.30 |
| Mg | 1.40 |
| Al | 1.40 |
| Fe-Mn-C | 0.60 |
| $TiO_2$ | 0.04 |
| $Li_2CO_3$ | 0.60 |
| $Li_2SiO_3$ | 0.75 |
| Fe | 4.41 |
| | 20.00 |
| Steel Shell | 80.00 |
| Total | 100.00 |

| Fe-Mn-C | 0.60 |
|---|---|
| Cellulose | 0.10 |
| Fe | 1.50 |
| | 16.00 |
| Steel Shell | 84.00 |
| Total | 100.00 |

* * * * *